United States Patent [19]

Schaeffer

[11] 4,065,531
[45] Dec. 27, 1977

[54] METHOD FOR MOLDING PRODUCTS FROM PARTICULATE POLYMERIC MATERIAL

[75] Inventor: Paul R. Schaeffer, Paoli, Pa.

[73] Assignee: The Alan I W Frank Corporation, Exton, Pa.

[21] Appl. No.: 686,982

[22] Filed: May 17, 1976

[51] Int. Cl.$^2$ .............................................. B29D 27/00
[52] U.S. Cl. ..................................... 264/41; 264/51; 264/126; 264/DIG. 65
[58] Field of Search ............ 264/53, 51, 41, DIG. 10, 264/DIG. 9, 45.4, 126, DIG. 65

[56] References Cited

U.S. PATENT DOCUMENTS

| | | | |
|---|---|---|---|
| 2,066,988 | 1/1937 | Lee | 264/124 X |
| 2,066,993 | 1/1937 | McCombs | 264/124 X |
| 2,250,697 | 7/1941 | Bassett | 264/124 |
| 2,954,589 | 10/1960 | Brown | 264/51 X |
| 3,170,010 | 2/1965 | Schultz et al. | 264/51 |
| 3,200,175 | 8/1965 | Harrison | 264/53 |
| 3,236,927 | 2/1966 | Thompson | 264/51 |
| 3,259,627 | 7/1966 | Zwick | 264/126 |
| 3,855,377 | 12/1974 | Uebelhart et al. | 264/DIG. 65 |

*Primary Examiner*—Philip Anderson
*Attorney, Agent, or Firm*—Reed, Smith, Shaw & McClay

[57] ABSTRACT

Apparatus for molding products from polymeric material comprising cooperating mold elements forming a mold cavity for receiving polymeric material to be molded and means for optionally introducing steam into thermoconductive relationship with the respective mold elements in parallel and in series. Also a method of molding products from polymeric material comprising introducing polymeric material into a mold cavity formed by cooperating mold elements, causing steam to flow in thermoconductive relationship with the respective mold elements in parallel during a portion of the molding cycle and causing steam to flow in thermoconductive relationship with the respective mold elements in series during another portion of the molding cycle.

4 Claims, 1 Drawing Figure

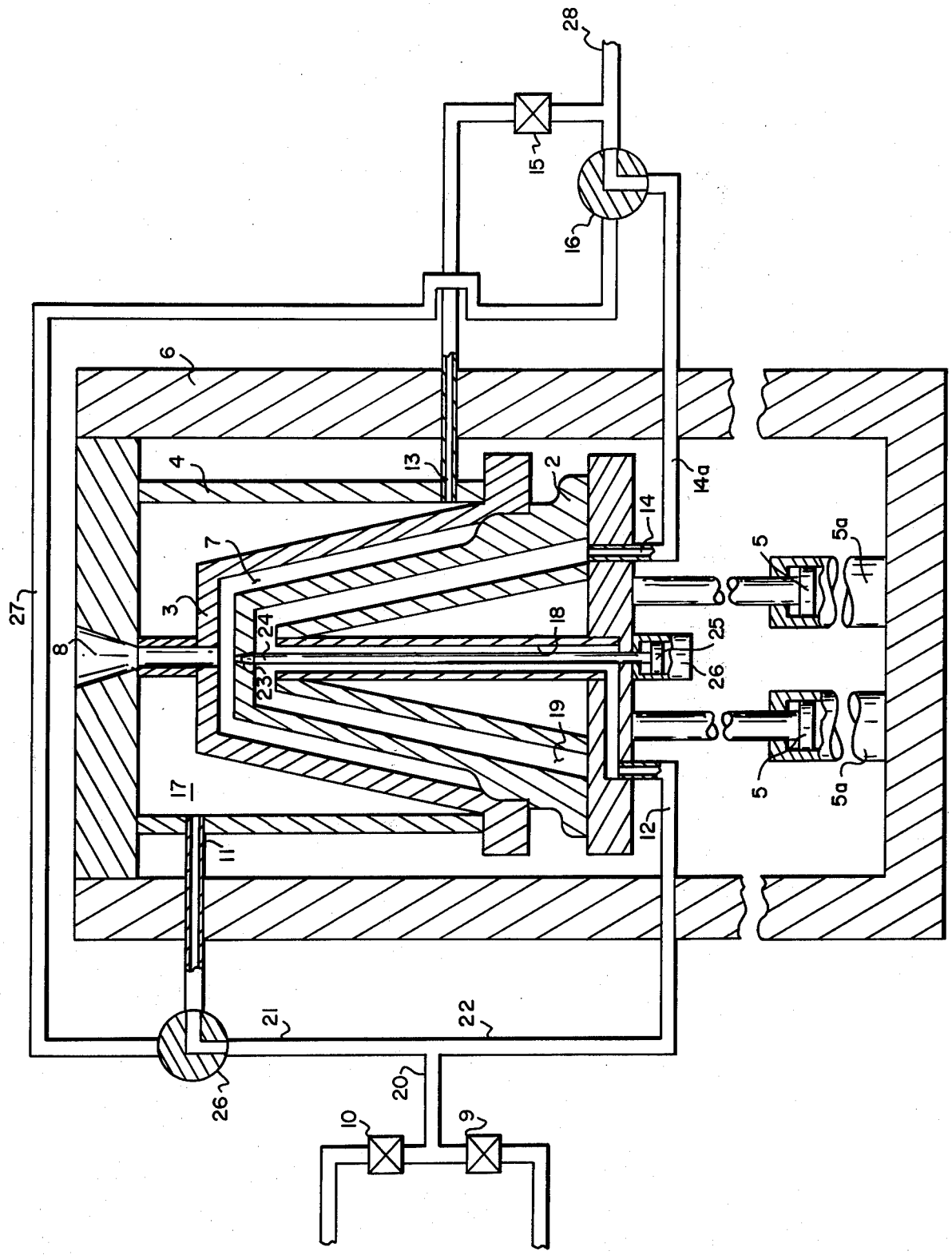

METHOD FOR MOLDING PRODUCTS FROM PARTICULATE POLYMERIC MATERIAL

This invention relates to an improved method for molding products from polymeric material. More particularly, it provides for a considerable reduction in energy in the form of steam required to mold polymeric material such, for example, as foamed polystyrene in the form of beads or spheres which is placed in a mold of metal or other thermoconductive material to mold products of various kinds such, for example, as cup-like products including drinking cups.

A typical cycle in the molding of foamed polystyrene beads into cups in a metal mold consists of the following steps: 1) mold closing, 2) mold filling, 3) mold heating, 4) steam injection, 5) cooling and 6) mold opening. Conventional molding machines operate with only one outlet valve controlling the discharge of steam and condensate from both the male and female mold elements, which mold elements when closed form a mold cavity which determines the shapes of the molded article. One of the mold elements receives steam to be injected into the mold cavity, which steam is delivered into the mold cavity through an injection device in that mold element. Usually the male mold element is the one through which the injection steam is injected into the mold cavity but in certain cases the female mold element may be used for that purpose.

Frequently in the present art steam is passed through both mold elements during steps 1, 2 and 3 of the molding cycle and during this time the discharge valve is in the open position. During step 4 it is closed preventing any further steam discharge; as is well known to those familiar with the process discharge of steam from the mold elements is desirably stopped during steam injection into the mold cavity. While this is a common sequence of steam flow in relation to the various steps mentioned above, modifications of this sequence are sometimes used to accommodate changes in mold design such as size or shape and materials.

In order to reduce steam consumption attempts have been made to close the discharge valve earlier in the cycle or to throttle the flow by partially closing the valve during steps 2 and 3. This has only limited success because of the tendency to impart porosity to the molded product resulting in poor resistance to leakage.

In my copending application Ser. No. 686,841, filed May 17, 1976, I have disclosed employing two valves, one to control the discharge of steam and condensate in thermoconductive relationship with one of the mold elements and one to receive the discharge of steam and condensate in thermoconductive relationship with the other mold element. I have discovered that steam consumption can be substantially reduced by employing a valve and pipe arrangement which provides for parallel flow of steam through the respective mold elements during the early part of the heat application step followed by series flow whereby the steam flows first through one of the mold elements then through the other mold element. Normally in series flow the steam will be directed to flow first through the male mold element and then through the female mold element. After heat application is complete parallel flow is resumed to cool the mold. I desirably add to the molding apparatus disclosed in my said copending application valved conduit means optionally effective for conveying steam from thermoconductive relationship with one of the mold elements into thermoconductive relationship with the other mold element so that the steam passes in thermoconductive relationship with the respective mold elements in series.

Other details, objects and advantages of the invention will become apparent as the following description of a present preferred embodiment of the invention and a present preferred method of practicing the same proceeds.

In the accompanying drawing I have shown a present preferred embodiment of the invention and have illustrated a present preferred method of practicing the same. The FIGURE is a diagrammatic cross-sectional view of apparatus for molding products from polymeric material embodying my invention.

As shown in the drawing the female mold element 3 receives the male mold element 2 by action of pistons 5 operable in cylinders 5a. Female mold element 3 is mounted to frame 6 by means of support 4. The mold cavity 7 formed by male mold element 2 and female mold element 3 is filled with foamed polystyrene beads introduced through fill hole 8 by suitable means not shown which are well known to those skilled in the art. Alternately steam and coolant such as water are delivered to the mold through valves 9 and 10 and each flows at 11 into the space or channel 17 in thermoconductive relationship with the female mold element 3 and through the conduit 12 and up within the tube 18 into the space or channel 19 in thermoconductive relationship with the male mold element 2 as well known to those skilled in the art. The steam and condensate leave the space or channel 17 at 13 and pass out through the valve 15 and leave the space or channel 19 at 14 and pass out through the conduit 14a and the valve 16. The common conduit 20 and the branches 21 and 22 constitute a manifold through which steam may flow in thermoconductive relationship with the respective mold elements in parallel.

I have modified the molding apparatus disclosed in my said copending application by adding a three-way valve 26 and changing the valve 16 to a three-way valve and adding a by-pass or return line 27 extending between the three-way valves 26 and 16, all as shown in the drawing. In the operation of my molding apparatus, with the valves 26 and 16 in the positions shown in the drawing, during mold closing steam flows in parallel in thermoconductive relationship with the male mold element 2 and the female mold element 3. Steam passes through valve 10 and conduits 20, 21 and 11 into the space 17 in thermoconductive relationship with the female mold element 3 and through conduits 22 and 12 and up within the tube 18 into the space 19 in thermoconductive relationship with the male mold element 2. Steam from the space 17 passes out through the conduit 13 and the valve 15, which is opened to the discharge line 28. Steam from the space 19 passes out through the conduits 14 and 14a and through the valve 16 to the discharge line 28. This combination of valve settings closes or isolates the by-pass or return line 27.

Parallel flow continues into mold closing until the steam first reaches the valve 16. At that time series flow is initiated by turning valve 16 90° in the clockwise direction viewing the drawing and turning valve 26 90° in the counterclockwise direction viewing the drawing. The steam from the space 19 is returned through the line 27 into the space 17 before passing out through the valve 15 and the discharge line 28. By such series flow I obtain additional heat transfer from the steam before it is discharged.

Series flow continues during mold filling with valve 15 open. Series flow also continues during mold heating and steam injection but valve 15 is closed during that period. During mold cooling valves 26 and 16 are returned to the positions shown in the drawing for parallel flow and valve 9 is opened to pass coolant through the mold and valve 15 is again opened to discharge. At the end of the mold cooling step the mold opens, the product is ejected and the cycle is repeated by suitable electrical programming techniques.

The duration of series flow or the point in the cycle sequence at which the series flow is utilized may be varied to accommodate changes in mold design or plastic materials.

Steam injection into the mold cavity 7 is accomplished at the appropriate time by downward retraction of piston 25 in air cylinder 26 which retracts connecting rod 24 and opens valve 23 so that steam in space 19 enters the mold cavity.

The conduits 12 and 14a are flexible to provide for movement of the male mold element into and out of cooperative relationship with the female mold element.

While I have shown and described a present preferred embodiment of the invention and have described a present preferred method of practicing the same, it is to be distinctly understood that the invention is not limited thereto but may be otherwise variously embodied and practiced within the scope of the following claims.

I claim:

1. In a method for molding products in a mold cavity formed by a male and female mold element which method includes the steps of closing the mold elements to form the cavity, heating said elements, filling said cavity with polymeric beads, injecting steam into the cavity and cooling said elements, the improvement in said method comprising:
   a. simultaneously introducing steam into both of said mold elements through spaces or channels therein while closing said elements to form said cavity;
   b. terminating the direct introduction of steam into said female mold element during mold element closing when steam begins to discharge from said male mold element and directing the steam discharged from said male mold element into the female mold element;
   c. filling said cavity with said polymeric beads;
   d. terminating the discharge of steam from said female mold element not later than the injection of steam into said mold cavity;
   e. injecting steam into the mold cavity to mold said product;
   f. terminating the introduction of steam into said male mold element and directly introducing into each of said mold elements a cooling fluid and permitting said fluid to separately flow through each of said elements; and
   g. terminating said flow of cooling fluid, opening said mold elements and removing said molded product.

2. The method as claimed in claim 1 wherein the direct introduction of steam into said female mold element is terminated and the steam directed from the male mold element into said female mold element is commenced after closing of said mold elements.

3. A method as set forth in claim 1 wherein said steam for introduction into both of said mold elements simultaneously is from a common source.

4. A method as set forth in claim 1 wherein injecting steam into said mold cavity includes directing steam from said male mold element into said cavity.

* * * * *